Sept. 6, 1932.  H. F. PARKER  1,875,392
BRAKE
Filed May 17, 1930  2 Sheets-Sheet 1

INVENTOR.
HUMPHREY F. PARKER
BY
ATTORNEY

Sept. 6, 1932.     H. F. PARKER     1,875,392
BRAKE
Filed May 17, 1930     2 Sheets-Sheet 2

INVENTOR.
HUMPHREY F. PARKER
BY
ATTORNEY

Patented Sept. 6, 1932

1,875,392

UNITED STATES PATENT OFFICE

HUMPHREY F. PARKER, OF SOUTH BEND, INDIANA, ASSIGNOR TO BENDIX BRAKE COMPANY, OF SOUTH BEND, INDIANA, A CORPORATION OF ILLINOIS

BRAKE

Application filed May 17, 1930. Serial No. 453,389.

This invention relates to brakes and more particularly to internal expanding brakes for aeroplanes.

A major object of the invention is to provide a brake structure in which the friction elements have a servo action in both forward and reverse braking.

An important object of the invention is to provide a brake structure in which distortion of the brake drum, due to the frictional coefficient, is reduced to a minimum.

Another object of the invention is to provide a brake structure having opposed secondary and primary friction elements.

A further object of the invention is to provide a brake structure having two sets of friction elements arranged for concomitant operation.

A still further object of the invention is to provide a brake structure in which the load is evenly distributed and the maximum engaging surface of the friction elements with the drum is attained.

A feature of the invention is a brake structure having four interchangeable friction elements comprising two sets of primary and secondary shoes and a single operating means therefor.

Other objects and features of the invention will appear from the following description taken in connection with the drawings, which form a part of this specification, and in which.

Figure 1:
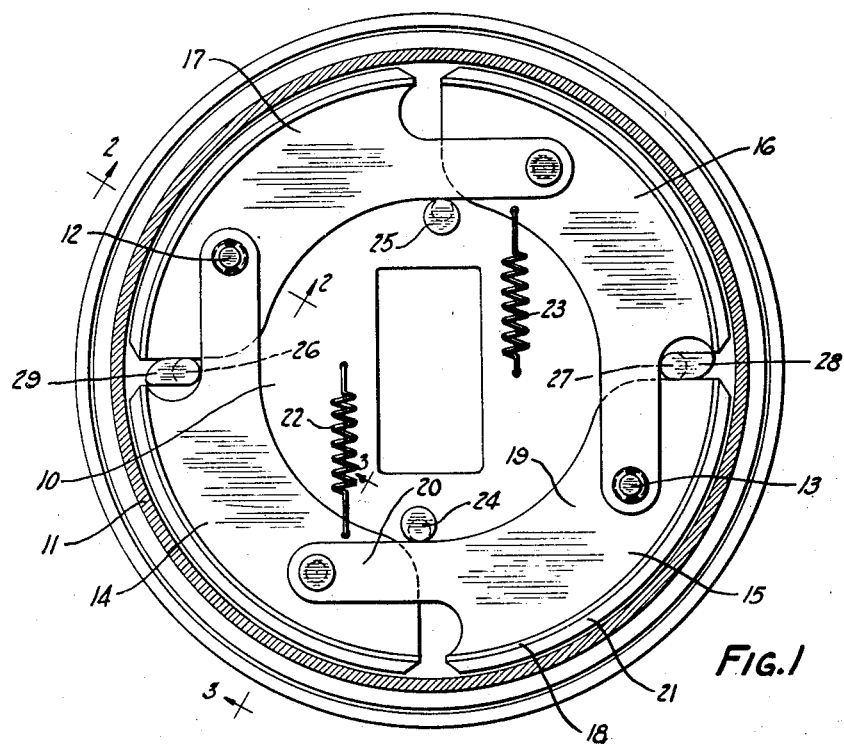
Figure 1 is section taken through the drum illustrating the friction members in elevation.
Figures 2, 3:
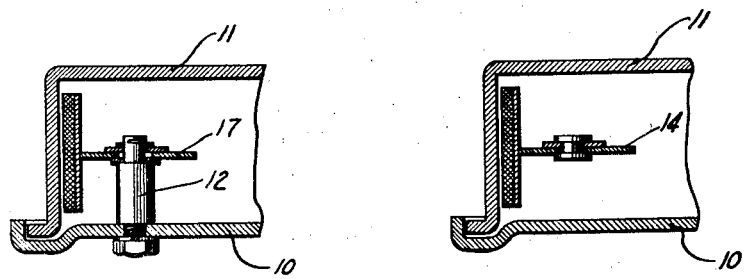
Figure 2 is a section substantially on line 2—2 Figure 1.
Figure 3 is a section substantially on line 3—3 Figure 1.
Figure 4:
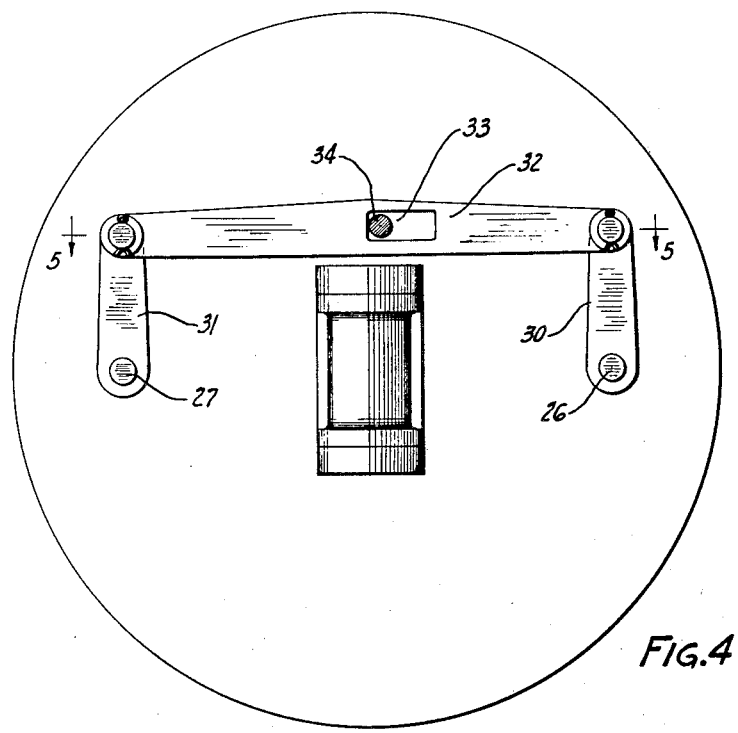
Figure 4 is a rear elevation of the brake.
Figure 5:
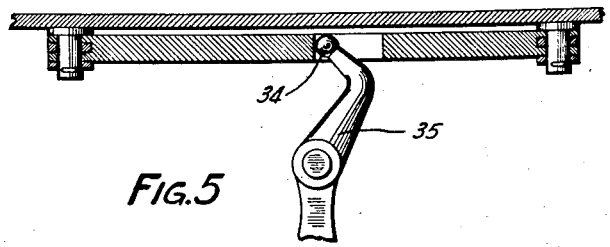
Figure 5 is a section substantially on line 5—5 Figure 4.

Referring by numerals to the drawings, 10 represents a fixed support such as a backing plate, having associated therewith a rotatable drum 11. Positioned on the plate are anchors 12 and 13. These anchors are diametrically disposed and are adapted to support two sets of primary and secondary shoes. As shown, a secondary shoe 14 is pivoted on the anchor 12 and pivoted to the toe of the secondary shoe is a primary shoe 15. A corresponding set of shoes comprising a secondary shoe 16 pivoted on the anchor 13, and a secondary shoe 17 pivoted to the toe of the secondary shoe 16, is provided.

The shoes 14, 15, 16 and 17 are interchangeable. Each comprise a rim 18, a web 19, having an extended arm 20 and a lining 21 suitably secured to the rim and adapted for engagement with the radius of the drum. When the brake is released the shoes are returned to the off position by suitable springs 22 and 23 connecting the secondary shoes to the fixed support or backing plate, where they are retained in proper spaced relation to the drum by stops 24 and 25. By reason of the particular structure of the shoes and arrangement on the backing plate, practically the whole radius of the drum may be engaged by the frictional surface of the shoe.

Diametrically disposed on the backing plate and positioned for rotation thereon are corresponding operating shafts 26 and 27 on which are positioned cams 28 and 29 adaptable for engaging the shoulders or toes of the primary shoes, and arranged on the shafts 26 and 27 on the back of the backing plate are crank arms 30 and 31 connected by bar 32 having a slot 33 receiving the end 34 of an operating lever 35 fulcrumed on a fixed support, not shown.

In operation, power is applied to the lever 35 to shift the bar 32. This shifting movement rocks the cranks 30 and 31 to force the cams 28 and 29 against the shoulders or toes of the primary shoes and to press them in engagement with the radius of the drum. This applied force is augmented by the whipping action of the drum and is transmitted through the arms 20 to the toes of the secondary shoes to more uniformly engage these shoes with the radius of the drum. In this connection it should be observed that there is a concomitant action between the two sets of shoes and that by reason of the opposed relation of the secondary and primary shoes respectively, the liability of distortion of the drum is materially reduced if not entirely obliviated.

Although this invention has been described in connection with certain specific embodiments, the principles involved are susceptible to numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising two sets of shoes, each set including a primary and secondary shoe, the sets arranged end to end with overlaying portions, the primary shoes being pivotally connected to the secondary shoes and the secondary shoes anchored through the opposite primary shoes, and means for imparting force to the primary shoes concomitantly.

2. A brake comprising on the support, two sets of shoes on the support, each set including a primary shoe pivoted to a secondary shoe having an extended heel anchored to the support through the toe of the opposite primary shoe, cams for actuating the primary shoes and means connecting the cams for concomitant operation.

3. A brake comprising a fixed support, two sets of shoes positioned for movement on the support each set including a primary and a secondary shoe having extended heels overlaying the toes of the adjacent shoes, the heels of the secondary shoes being anchored to the support and the heels of the primary shoes being pivoted to the secondary shoes, cams for directing force to the primary shoes and means connecting the cams for concomitant operation.

4. A brake comprising a fixed support, a rotatable drum associated therewith and interchangeable shoes positioned for movement on the support, two of the shoes being anchored on the support and the other two pivotally connected to the toes of the anchored shoes, means for actuating the shoes in pairs including cams, rock-arms connected to the cams, a bar connecting the rock-arms having a slot and an operating lever engaging the slot in the bar.

In testimony whereof, I have hereunto signed my name.

HUMPHREY F. PARKER.